(12) United States Patent
Mirsky et al.

(10) Patent No.: US 6,956,006 B1
(45) Date of Patent: Oct. 18, 2005

(54) MODIFIED TITANIUM DIOXIDE AND A METHOD FOR ITS PREPARATION

(75) Inventors: Yaacov W. Mirsky, Beer Sheva (IL); Marina N Gorlova, Kirishi (RU)

(73) Assignee: Rotem Amfert Negev Ltd. (IL)

( * ) Notice: Subject to any disclaimer, the term of this patent is extended or adjusted under 35 U.S.C. 154(b) by 0 days.

(21) Appl. No.: 09/623,007

(22) PCT Filed: Feb. 24, 1998

(86) PCT No.: PCT/IL98/00090

§ 371 (c)(1),
(2), (4) Date: Jan. 12, 2001

(87) PCT Pub. No.: WO99/43616

PCT Pub. Date: Sep. 2, 1999

(51) Int. Cl.$^7$ ................................................. B01J 21/08
(52) U.S. Cl. .................. 502/236; 502/232; 502/233; 502/234; 502/237; 502/239; 502/242; 502/349; 502/350; 423/610; 423/701; 423/702; 423/705; 423/713; 106/436; 501/134
(58) Field of Search ................................. 502/232, 233, 502/234, 236, 237, 239, 242, 349, 350; 423/610, 701, 702, 705, 713; 106/436; 501/134

(56) References Cited

U.S. PATENT DOCUMENTS

| | | | |
|---|---|---|---|
| 3,887,494 A | 6/1975 | Dietz | 252/452 |
| 4,081,510 A | 3/1978 | Kato et al. | 423/237 |
| 4,176,089 A | 11/1979 | Cull | |
| 4,388,149 A | 6/1983 | Kimmerle et al. | 162/153 |
| 4,388,288 A | 6/1983 | Dupin et al. | 423/416 |
| 4,422,958 A | 12/1983 | Dupin | 502/217 |
| 4,422,960 A | 12/1983 | Shiroto et al. | 502/206 |
| 4,537,873 A | 8/1985 | Kato et al. | 502/242 |
| 4,876,372 A | 10/1989 | Nakanishi et al. | 549/529 |
| 4,929,586 A | 5/1990 | Hegedus et al. | 502/217 |
| 4,977,127 A | 12/1990 | Rikimaru et al. | 502/309 |
| 5,120,701 A | 6/1992 | Brand et al. | 502/350 |
| 5,162,283 A | 11/1992 | Moini | 502/236 |
| 5,175,136 A | 12/1992 | Felthouse | 502/242 |
| 5,371,056 A | 12/1994 | Leyrer et al. | 502/66 |
| 5,389,309 A | 2/1995 | Lopez | 252/606 |
| 5,451,390 A | 9/1995 | Hartmann et al. | 423/610 |
| 5,672,330 A | 9/1997 | Hartmann et al. | 423/610 |
| 5,703,272 A | 12/1997 | Abe et al. | 560/231 |
| 5,718,878 A | 2/1998 | Zhang | 423/610 |

FOREIGN PATENT DOCUMENTS

| | | |
|---|---|---|
| EP | 0311515 A1 | 4/1989 |
| EP | 0668100 A1 | 8/1995 |
| EP | 0722905 B1 | 7/1996 |
| EP | 0826410 A3 | 3/1998 |
| EP | 0826410 A2 | 3/1998 |
| WO | WO 96/09117 | 3/1996 |
| WO | WO 99/39825 | 8/1999 |

OTHER PUBLICATIONS

Notari, B., "Microporous Crystalline Titanium Silicates," *Advances in Catalysis*, 41:253–327 (1996).
Swain, J.E., et al., "Characterization of titania surface area in titania/silica SCR catalysts by temperature–programmed reaction of 2–propanol," *Applied Catalysis A: General*, 139:175–187 (1996).
Ko, E. I., et al., "A Study of Acidic Titania/Silica Mixed Oxides and Their Use as Supports for Nickel Catalysts," *Journal of Catalysis*, 105:511–520 (1987).
Dutoit, D. C. M., et al., "Titania–Silica Mixed Oxides, I. Influence of Sol–Gel and Drying Conditions on Structural Properties," *Journal of Catalysis*, 153:165–176 (1995).
Hutter, R., et al., "Titania–Silica Mixed Oxides, II. Catalytic Behaviour in Olefin Expoxidation," *Journal of Catalysis*, 153:177–189 (1995).

*Primary Examiner*—Elizabeth D. Wood
(74) *Attorney, Agent, or Firm*—Hamilton, Brook, Smith & Reynolds, P.C.

(57) ABSTRACT

The invention relates to a composite material comprising silicon and titanium dioxide characterized by an enhanced thermal and hydrothermal stability of the pore structure. The composite is obtainable by precipitating titanium hydroxide from an aqueous solution containing sulfate salts and urea, followed by an hydrothermal treatment in the mother liquor, and by reacting the precipitate with a basic silica sol. The composite has a specific surface area of up to 228 m$^2$/g for a material calcined at 800° C. for 3 hours, and is suitable for catalyzing a variety of reactions, including Claus reaction and degradation of organic impurities.

16 Claims, 3 Drawing Sheets

MODIFIED TITANIUM DIOXIDE AND A METHOD FOR ITS PREPARATION

The present invention relates to Titanium dioxide. More particularly, the invention relates to a novel modified Titanium dioxide and method for its preparation.

BACKGROUND OF THE INVENTION

Titanium dioxide has been known to be produced by drying or calcining of Titanium hydroxide. There are various methods of producing Titanium hydroxide from different types of Titanium compounds.

Three crystalline forms of Titanium dioxide are known in the art: Anatase, Rutile and Brookite, Anatase or amorphous Titanium dioxide partially crystallized into Anatase, are commonly used as catalysts (for example see U.S. Pat. Nos. 4,388,288 and 4,422,958).

In most catalytic processes carried out in gas phase or liquid phase it is extremely viable to use catalysts with developed meso and macropore structure, which accounts for a high catalytic activity and for a high rate of reagents diffusion inside granules or shaped blocks of catalysts, and diffusion of reaction products outside the catalysts structure.

Mesopore structure is determined by the method of the active material precipitation from a solution and its subsequent treatment.

Macropore structure is determined mainly by the process of granulation or shaping.

Many catalytic processes are carried out under increased temperatures where Titanium dioxide undergoes shrinkage. Its active surface area is reduced and its activity is also decreased. Since the heat treatment will take a long period of time, the Titanium dioxide aging process leads to its structure transformation from Anatase to rutile crystalline form, and these alterations cause a significant decrease in its catalytic activity. Since Titanium dioxide is quite an expensive material it is most desirable that such catalyst should possess a prolonged effective period of use.

In order to increase the thermal stability of Titanium dioxide, various additives were suggested. Thus, in order to increase its stability, when it is obtained from Titanium oxychloride by precipitation with an aqueous solution of ammonia at a pH of 7.8, at least one stabilizing agent is incorporated. Useful agents for this purpose may be selected from aluminium, sodium, potassium, calcium or other chlorides, nitrates and powdery silica. The criterion of thermal stability is based on the change in the specific surface area of a sample calcined at 575 degrees C. for seven hours, compared with a sample calcined only for one hour at the same temperature (see French patent application No. 2,621,577 and European Patent Application No. 0311,515).

Several investigations were performed in the field of Titania/Silica mixed oxides preparation. The idea of this approach is a coprecipitation of titanium hydroxide and silicic acid, Titania/Silica mixed oxides preparation and their use as supports for Nickel catalyst were described (Journal of Catalysis 105, p. 511–520 1987). As mentioned therein, a mixed oxide was precipitated from a mixture of $TiCl_4$ and $SiCl_4$.

Precipitation of titanyl sulfate in the presence of a powdery dry silica (SYLOID-74) was carried out in order to prepare samples containing 20%, 40% and 80% by weight TiO2 and investigations with these precipitates as catalyst for selective catalytic reduction of NOx, were described in Applied Catalysis A, General 139, 1996, pages 175–187.

The method for the preparation of Titania-Silica mixed oxides with alkoxide sol-gel method was described in Journal of Catalysis, 153, p. 165–176 (1995). As mentioned therein, tetra-isopropoxy-titanium and tetra-methoxysilicon were used as starting materials. Various titania-silica aerogels obtained by an alkoxide-sol-gel route, were prepared and tested in the reaction of epoxidation of olefins (Journal of Catalysis 153, 177–189, 1995), Crystalline titanium silicates having specific adsorption and catalytic properties were described in literature (Advances in Catalysis, Vol. 41, 253–327, 1996).

The above brief review illustrates the importance attributed to the subject of obtaining a novel type of titanium dioxide.

It is an object of the present invention to provide a novel modified Titanium dioxide and methods for its preparation. It is another object of the present invention to describe various uses of the novel modified Titanium dioxide.

BRIEF DESCRIPTION OF THE INVENTION

A novel titanium dioxide modified with urea in the stage of a titanium hydroxide precipitation from an aqueous solution containing a mixture of dissolved sulfate salts, including titanyl sulfate, following a hydrothermal treatment of the precipitated hydroxide in its mother liquor and then modified with a basic silica sol in the stage of the formed titanium hydroxide or dried titanium dioxide, being characterized by a high catalytic activity, an enhanced thermal stability as measured by a specific surface area of up to 240 $m^2/g$ for a sample in which 15% of silicon (calculated as $SiO_2$) was introduced into the titanium hydroxide structure during the interaction with basic silica sol and calcined at 800° C. for three hours. The above novel titanium dioxide composition is most useful as a catalyst in many fields such as photocatalyst and as a carrier in catalyst compositions for removal of organic materials present in air. A method for the preparation of the above modified titanium dioxide is also described.

DETAILED DESCRIPTION OF THE INVENTION

Figure 1:
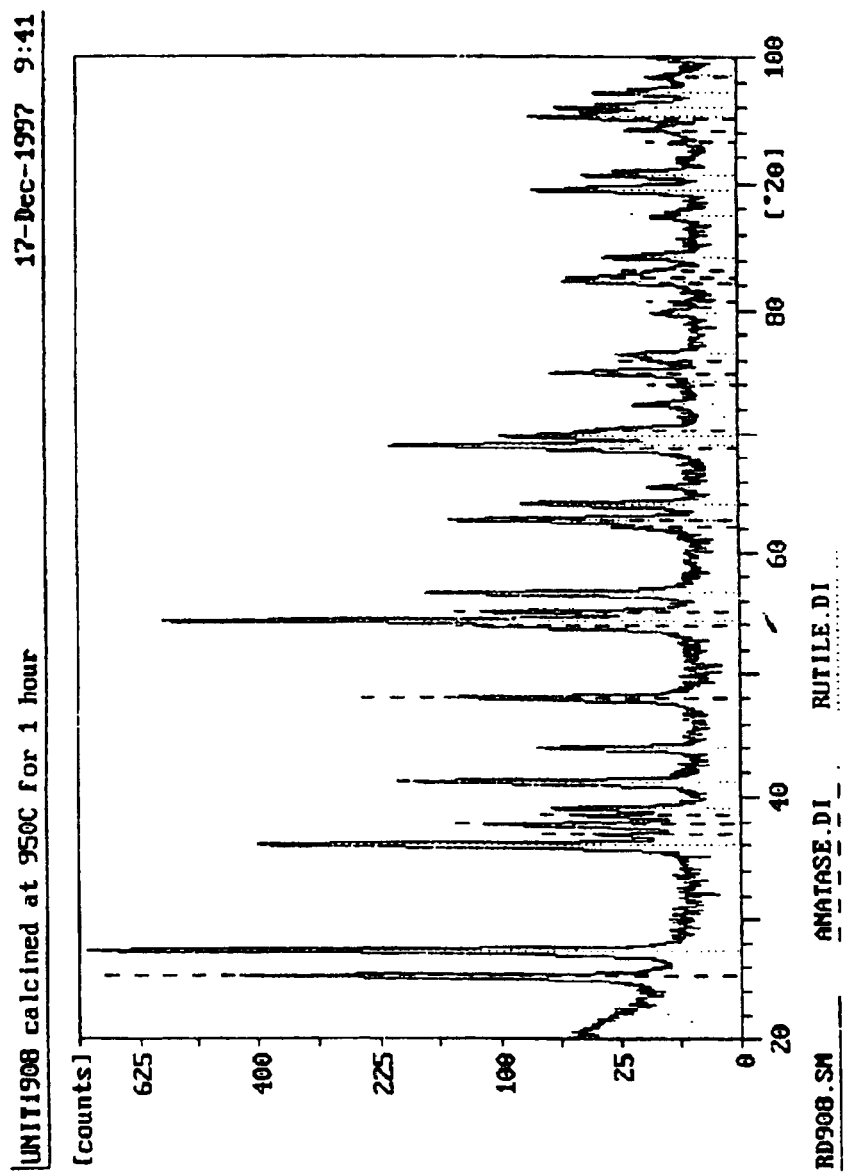
FIG. 1 is an X-ray diagram for commercial titanium dioxide.

Modified titanium dioxide is prepared from two types of starting materials. The first one is an aqueous solution containing a mixture of dissolved sulfate salts including titanium sulfate, having a pH up to 1.7.

The second one is titanium hydroxide or titanium dioxide prepared by any known method.

In the first case, titanium dioxide is prepared from titanium hydroxide precipitated and hydrothermally treated in its mother liquor in the presence of urea and further modified with basic silica sol.

In the second case, titanium hydroxide or titanium dioxide in the form of dough, paste, or suspension, is brought to a pH in the range of 6.0–11 with urea or ammonia and then interacted with a basic silica sol.

The first type of starting materials includes solutions of a double salt ammonium titanyl sulfate $(NH_4)_2TiO(SO_4)$ $_2$nH$_2$O, commercially produced as acid titanyl sulfate solution, for example UNITi 992 or a similar acid titanyl sulfate solution prepared with different titanium dioxides, or titanium hydroxides dissolved in sulfuric acid. In another case, for example the dried titanium hydrolysates commercially produced (UNITi 908™, FINNTi S-230) can be dissolved in sulfuric acid with a concentration of about 70%, producing an acid titanyl sulfate solution.

Both commercial acid titanyl sulfate solution and a similar one prepared as described above, have to be partially neutralized to a maximum pH as mentioned above. These partially neutralized solutions contain a mixture of titanyl sulfate with other sulfate salts. Typical examples of these sulfate salts are: sodium sulfate, potassium sulfate, calcium sulfate, magnesium sulfate and ammonium sulfate. These partially neutralized solutions can be used as starting materials for the modified titanium dioxide preparation.

The solution of the above mentioned ammonium titanyl sulfate salt may be used as a starting material in its aqueous solution containing besides titanyl sulfate, ammonium sulfate, the pH of this solution being in the range of 0.7 to 0.9.

In contrast to the usual commercial titanium dioxides or similar products manufactured by known methods, the modified titanium dioxide produced from the first type of starting materials as mentioned above, is characterized by a specific combination of high surface area, an enhanced thermal and hydrothermal stability of the pore, a crystalline structure, a decreased sulfur content and a high catalytic activity.

Typical examples of the second type of starting materials are the intermediate products of titanium pigment UNITi 902™ and final materials produced by FINNTi S-140™ and FINNTi-150™.

Titanium Hydroxide cake precipitated according to the European Patent Application No. EP 0722905 A1 (after washing but without adding potassium hydroxide and phosphoric acid) as well as Titanium Hydroxide or Titanium Dioxide precipitated according to U.S. Pat. No. 4,929,586 (before vanadyl oxalate addition) can be also used as a starting material of the second type.

The thermal stability of modified titanium dioxide produced from the second type of starting material is similar to that of modified titanium dioxides produced on the basis of the first type of starting material. The modified titanium dioxides produced on the basis of the second type of starting materials, are characterized by a decrease in the sulfur content compared with the starting materials.

Titanium dioxide possessing the above improved properties are unknown up to the present invention.

According to the present invention, two modifiers can be used during a particular procedure for producing the novel modified titanium dioxide.

These modifiers are urea and basic silica sol i.e. a colloidal solution of silica having a pH of above 7.0.

Urea is a known commercial product, which can be used either in a solid form or in an aqueous solution.

There are known silica sols colloids which contain particles of silica with a diameter in the range of 2–100 nm. The inner part of each particle, consists almost of dehydroxylated silica, while silicon atoms located in the outer part of each particle, are hydroxylated. Silica sols can be stable, if some cations compensate the negative charge of silica particles. Among the useful cations to be present, it should be mentioned sodium, potassium and ammonium. Commercial silica sols, prepared with any known procedure, usually with a cation exchange method, can be used as modifiers.

Such sols can also be prepared during the process of modified titanium dioxide preparation with any other known procedure.

Basic silica sol is used as a modifying agent for the formed titanium hydroxide or for the dry titanium dioxide. The titanium hydroxide is separated from the mother liquor and washed. The titanium hydroxide obtained in the form of a suspension, wet cake, or dried material, is treated with basic silica sol under conditions which exclude the coagulation of a sol. However, these conditions promote the reaction between hydroxylated silica particles of the sol and the hydroxylated surface of titanium hydroxide or titanium dioxide.

In case of using the second type of starting materials in the form of an aqueous suspension, wet cake or dough, it is mixed with an alkali constituent selected from urea, ammonia, sodium or potassium hydroxide, leading a titanium hydroxide or titanium dioxide having a pH in the range of 6.0 to 11.0. To the resulted mixture, a basic silica sol is introduced and a reaction occurs between the hydroxylated surface of silica particles and the hydroxylated surface of titanium hydroxide or titanium dioxide.

The process of the modified titanium dioxide preparation from the first type of starting material consists of the following steps:

a. preparing the initial sulfate solution;

b. precipitation of Titanium hydroxide from the above mentioned sulfate solution in the presence of urea followed by a hydrothermal treatment of the formed Titanium hydroxide in its mother liquor, also in the presence of urea as modifier, c. separation of the formed precipitated Titanium hydroxide and its washing;

d. the dough, wet cake, or dried material, or the resulted water suspension of the formed precipitated Titanium hydroxide treatment with basic silica sol as the modificating agent;

e. filtration of Titanium hydroxide and washing with water; and f. transformation of Titanium hydroxide into Titanium dioxide by a heating treatment.

The detailed description of the procedure for obtaining the modified titanium dioxide, using the first type of starting material is as follows:

In stage (a) an aqueous acid solution comprising titanyl sulfate is partially neutralized, thus producing a mixture of sulfate salts having a pH up to +1.7 and preferably in the range of between 0.02 to 1.2. This neutralization is carried out with various alkali compounds such as sodium hydroxide, sodium carbonate, potassium carbonate or bicarbonate, an aqueous solution of ammonia, calcium compounds, etc.

In case of the calcium compounds, an insoluble calcium sulfate is produced and preferably it has to be separated from the neutralized solution. The solution obtained can be used for titanium hydroxide precipitation, following a hydrothermal treatment (stage b) containing a mixture of titanyl sulfate and another dissolved sulfate salt. Generally, the solution has a concentration in the range of between 20 to 250 g/l titanium and preferably between 40–150 g/l (calculated as TiO2).

The above solution can be used directly in stage "b" in the presence of urea as modifier, or it can be maintained at a temperature in the range of between 20° to 70° C. for a period between 0.3–300 hours.

The weight ratio between the quantity of urea added to the solution to the quantity of titanium dioxide present in the solution has to be in the range of between 0.3 to 11.0. Titanium dioxide precipitation takes place either during the urea addition, or during heating the solution to about 70° to 200° C., more specifically about 80° to 100° C. Although the duration of stage "b" is generally in the range of between 0.5 to 5 hours, the precipitation of titanium hydroxide is quicker. The main part of the above mentioned period is required for the hydrothermal treatment of the precipitated titanium hydroxide. The urea introduced into the sulfate solution reacts in the step of precipitation as well as in the process of hydrothermal treatment of the precipitated titanium hydroxide in its mother liquor. The duration of stage "b" depends on the titanyl sulfate content in the solution, the pH of the solution before urea addition, the amount of urea added and the temperature which prevails in the mixture.

The precipitated titanium hydroxide after being subjected to a hydrothermal treatment is separated from the mother liquor and washed (stage "c").

The titanium hydroxide produced after a thermal treatment at a temperature in the range of between 70°–250° C., preferably 70° to 200° C., is characterized by a high surface area, a developed mesopore structure and a decreased sulfur content. In order to improve the above properties and to enhance its thermal stability, it is necessary to use also a second modifier (stage "d"). For this purpose, titanium hydroxide in the form of a dough, wet cake, suspension or dried material, has to possess a pH in the range of 6.0 to 11.0 and preferable between 8 to 10. This adjustment may be carried out with urea, ammonia or their mixture introduced into the above mentioned dough, wet cake or suspension of the titanium hydroxide. Then, this titanium hydroxide is mixed with basic silica sol having a concentration of between 1% to 40% and preferable in the range of between 3% to 20% by weight calculation as $SiO_2$. The required quantity of silica sol has to be as a weight ratio of $SiO_2$ to $TiO_2$, in the range of between 0.01 to 0.30 and preferably between 0.05 to 0.15.

The temperature during this stage of modification may be between the ambient one and the boiling point of the liquid phase. At the above conditions, an intensive chemical interaction of silica sol with titanium hydroxide takes place. The coagulation of silica sol into silica gel is avoided due to the high pH.

As a result of this interaction, and at a ratio between silica sol and titanium hydroxide of 0.1 by weight, substantially all the quantity of $SiO2$ present in the solution is consumed by the titanium hydroxide. When said ratio is above 0.13, some of the residual silica sol can be detected in the respective solution.

The result of the above interaction, when the ratio between the sol and titanium hydroxide is calculated on the weight ratio between $SiO2$ and $TiO2$ of about 0.1, substantially all the $SiO2$ from the solution is consumed by the titanium hydroxide. When the above ratio is above 0.13, some residual sol after the reaction can be detected in the solution.

The rate of interaction between the basic sol and hydroxylated surface of titanium hydroxide or titanium dioxide at ambient temperature is low, but increases when the temperature is also increased. It may be assumed that as a result of this interaction, some chemical bonds Ti—O—Si are formed and as a result, a reinforcement in the structure of the network occurred.

The modified titanium hydroxide can be used either in the form of a wet cake, or a suspension in the catalyst manufacture, or can be dried at a temperature between 100° C.–250° C. and after that calcined at about 500° C.

The modified titanium hydroxide obtained was analyzed by the following tests for the dry samples as well as for samples calcined at a temperature between 500° C. to 900° C.:

- determination of the specific surface area, using the so called "1 point method"
- specific surface area and specific adsorption pore volume, as determined
- with a Coulter Instrument SA 3100, and
- the respective chemical analyses, carried out using the known tests.

The catalytic activity of the titanium dioxide prepared according to the present invention used in the conversion of hydrogen sulfide to elemental sulfur known as the Claus process, was determined in a bench scale pilot plant, after mixing with an inert filler and the resulted dough conveyed through an extrusion, the wet extrudates being dried and calcined. The catalytic activity of the titanium dioxide in hydrolysis of carbonyl sulfide or carbon disulfide was also determined.

The titanium dioxide was also tested as a carrier of a catalyst used in the oxidation of organic impurities present in air. Also, the titanium dioxide according to the present invention was successfully used as a photocatalyst for degradation of organic impurities in water.

The invention will be hereafter illustrated by a number of examples, being understood that these examples are presented only for a better understanding of the process, without imposing any limitation to the invention as covered by the appended Claims.

EXAMPLE 1

An amount of 2 kg of solid ammonium titanyl sulfate containing about 20% of $TiO_2$ and 27% water of crystallization, was dissolved in 4 l of demineralized water at room temperature during overnight, using a moderate stirring. The non-dissolved portion was separated by filtration. The resulted solution contained 80 g/l titanyl sulfate (calculated as $TiO_2$) which corresponds to the formula of the respective double salt $(NH_4)_2TiO(SO_4)_2$ and an amount of ammonium sulfate. An amount of 175 g of urea was added to 500 ml of the solution, at room temperature and the resulted solution was heated and maintained at a temperature in the range of between 97°–102° C. for about 3 hours. The precipitated Titanium hydroxide was separated from the mother liquor and washed with demineralized water. The resulted wet cake of titanium hydroxide was suspended in a basic silica sol, prepared from a commercial sodium silicate solution as known in the art, the pH being increased to about 8.5 by treating with an aqueous solution of ammonia.

An amount of about 41 g of the basic sol was mixed with the titanium hydroxide cake, corresponding to a SiO2:TiO2 weight ratio of about 0.03. The mixture was maintained at about 90° C. for 30 minutes under a moderate stirring. The residual quantity of silicon in solution was negligible. The wet cake of titanium hydroxide was converted into titanium dioxide, by drying first at 100° C. for about 2 hours and further at about 250° C. for half hour. The properties of the product obtained are given in Table 1.

EXAMPLE 2

The titanium dioxide was prepared as in Example 1, but the amount of the basic silica sol used corresponded to a weight ratio SiO2:TiO2 to 0.05 (as in Table 1). The data on the specific surface areas of the prepared sample and the respective thermal stability, compared with typical commercial titanium dioxide, are given in Table 1.

EXAMPLES 3 to 5

The first stage of titanium dioxide preparation, was based on a titanyl sulfate solution, having a composition similar to a commercial titanyl sulfate and sulfuric acid solution, known as "UNITi 992" produced by Kemira Pigments Inc. The solution (A) contained 9.5% by weight TiO2 and 37% by weight sulfuric acid was prepared as follows:

An amount of 9.8 kg of a commercial titanium dioxide (hydrolysate) UNITi 908, having a loss on ignition of 19.6 by weight (at 1000° C.), was dissolved in an amount of 43.8 kg of boiling sulfuric acid having a concentration of 70% by weight). After cooling, an amount of 1 l of this solution was diluted with an equal volume of demineralized water. The result d solution having a concentration of 123 g/l TiO2, was used in the Examples 3 to 5. The same solution, but with another content of titanium dioxide, was used in Examples 6 to 18.

In Examples 3 to 5, 1 l of acid titanyl sulfate solution, having a concentration of 123 g/l (calculated as TiO2) was gradually neutralized with 481 grams of an aqueous solution of ammonia, containing about 25% by weight of ammonia. The temperature of the starting solution was 22° C., but during the neutralization it increased to about 55°–65° C. and maintained at this level with stirring, for about one hour. To the above solution, an amount of 780 ml of demineralized water was added and the resulted solution had a pH of 0.90. To the above mentioned solution, an amount of 409 g of urea was added and then heated to 98° C. and maintained at this level for about two and half hours (see Table 2). The precipitated titanium hydroxide was separated from the mother liquor and washed with demineralized water. The resulted wet cake was divided in three portions, used in the Examples 3, 4 and 5. Each wet cake sample was diluted with demineralized water, obtaining a suspension which had a concentration of 10% (calculated as TiO2).

A basic silica sol was prepared as known in the art, but different cations were used for the sol stabilization; in Example 3: sodium, in Example 4: potassium and in Example 5: ammonium. In each Example, the amount of basic sol used, calculated as % of SiO2 to TiO2 was 10% (by weight). The three different basic silica sots were mixed separately with the above mentioned three samples of suspension and the resulted mixtures were heated to about 90° C. and maintained at this temperature for about 1 hour. In each case, substantially all the quantities of silica were consumed by the titanium hydroxide. The resulted precipitates were separated from the liquid phase by filtration and converted into titanium dioxides by a thermal treatment at four different temperatures: 100° C., 500° C., 700° C. and 900° C.

The conditions for the interaction of precipitated titanium hydroxides with basic sols, are described in Table 3 and the values of specific surface areas are given in Table 4. Each type of basic silica sol (stabilized with sodium, potassium or ammonium) can act as stabilizer, but as can be noticed, with ammonium the stabilizing effect is higher than with sodium or potassium. Accordingly, the further experiments were carried out with basic silica sols stabilized with ammonium.

EXAMPLES 6 to 17

In these Examples, the same acidic titanyl sulfate solution (solution A) as described in Examples 3 to 5, was used as a starting material but with a different dissolution before neutralization and also with a different extent of neutralization. The concentrations of the solutions before neutralization, were in the range of between 70 to 128 g/l TiO2. The pH values of the neutralized final diluted solutions were in the range of between 0.02 to 1.67. The final value for each Example as well as the respective conditions of precipitation are given in Table 2.

In the Examples 6 and 6A the neutralized solution was maintained at 50° C. for 5 hours and 30 minutes before urea addition; in Example 15 the neutralized solution was maintained at 55° C. for 8 hours after urea addition.

In Example 17, the acid titanyl sulfate solution was first neutralized with calcium carbonate reaching a pH of 0.09, then the formed calcium sulfate was filtered out. The final neutralization of the solution was carried out with ammonium bicarbonate, reaching a pH of 0.69 as shown Table 2. The conditions of the precipitated titanium hydroxides in the interaction with the basic sols are given in Table 3. As can be noticed, titanium hydroxide was treated with silica sol, both in suspension and also in a wet cake. The concentrations of sols were changed in a wide range from 3% to 20.6% by weight SiO2.

The properties of the modified titanium hydroxides are given in Tables 4, 8, 9, 10, 11, 12, 13, 14 and X-Ray diagrams for samples 6 and UNITi 908. As can be noticed from these Tables and X-Ray diagrams, modified titanium dioxides are characterized by a significant higher thermal and hydrothermal stability than the known titania and titania/silica mixed oxides.

The sample prepared in Example 12 was investigated with the EDAX method and the data regarding the respective compositions by weight at different points are presented below:

|         | $TiO_2$ | $SiO_2$ | CaO    |
|---------|---------|---------|--------|
| point 1 | 87.5    | 12.3    | 0.2    |
| point 2 | 87.7    | 12.3    | absent |
| Bulk    | 87.8    | 12.1    | 0.1    |

As can be noticed there are slight variations from one point to another, but titanium and silicon are present in each point. No separate phases of TiO2 or SiO2 exist. The calcium presence results from an impurity in the sample.

EXAMPLE 18

In this Example an acidic silica sol was introduced in a titanyl sulfate solution, neutralized with ammonia in an amount corresponding to 10% as SiO2 calculated on the TiO2 content in the solution, present as titanyl sulfate. The resulted solution was heated and the precipitation of titanium hydroxide took place in the presence of silica sol. The other conditions for titanium hydroxides precipitation are given in Table 2.

Figure 2:
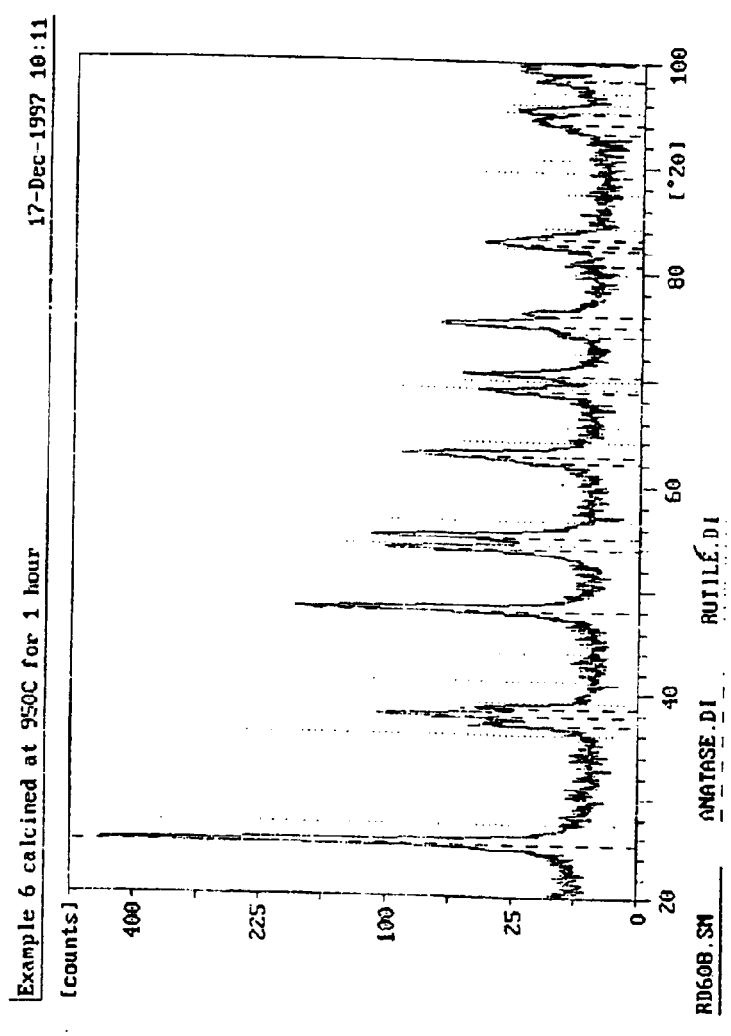
FIG. 2 is an X-ray diagram for modified titanium dioxide (example 6).

The effect of high thermal stability is also noticed from the attached X-Ray diagrams (FIGS. 1 and 2) in respect to Example 6 and compared with commercial $TiO_2$ (UNITi 908). After calcination at 950° C. for 1 hour, sample 6 contains only anatase, at the same time commercial titanium dioxide UNITi 908 was converted only partially into rutile (about 60%).

A definite stabilizing effect can be detected also in this case, although it is less than with the same amount (10%) of the basic silica sol added to the titanium hydroxide under the conditions as described above (compare Examples 5 and 18 in the Tables 2 and 4.)

EXAMPLE 19

In this example, acid and basic silica sols were used and their modifying effects were compared. The criterion of effectiveness was the decrease in the specific surface area of the titanium dioxides as prepared in Examples 13 and 16. In all these experiments corresponding titanium hydroxides were introduced into silica sols having a concentration of 3% calculated as SiO2. In one experiment it was an acid sol and in another one, it was a basic sol stabilized with an ammonium cation. As can be noticed from Table 5, both the acid and the basic sols increase the stabilizing effect, but the basic sol provides a much higher stabilizing effect.

EXAMPLES 20–22

In these Examples, the preparation of titanium dioxide with an enhanced thermal and hydrothermal stability according to the present invention was used and compared with a commercial titanium dioxide. In Examples 20 and 21, titanium hydrolysates (S-140 and S-150) as produced by KEMIRA PIGMENT OY (Finland) were used. In Example 22, a hydrolysate (UNITi 908) produced by KEMIRA PIGMENT (U.S.A.) was used. The beneficial effects of the method according to the present invention, are evident from the Tables 6, 7, 8 and 13.

Figure 3:
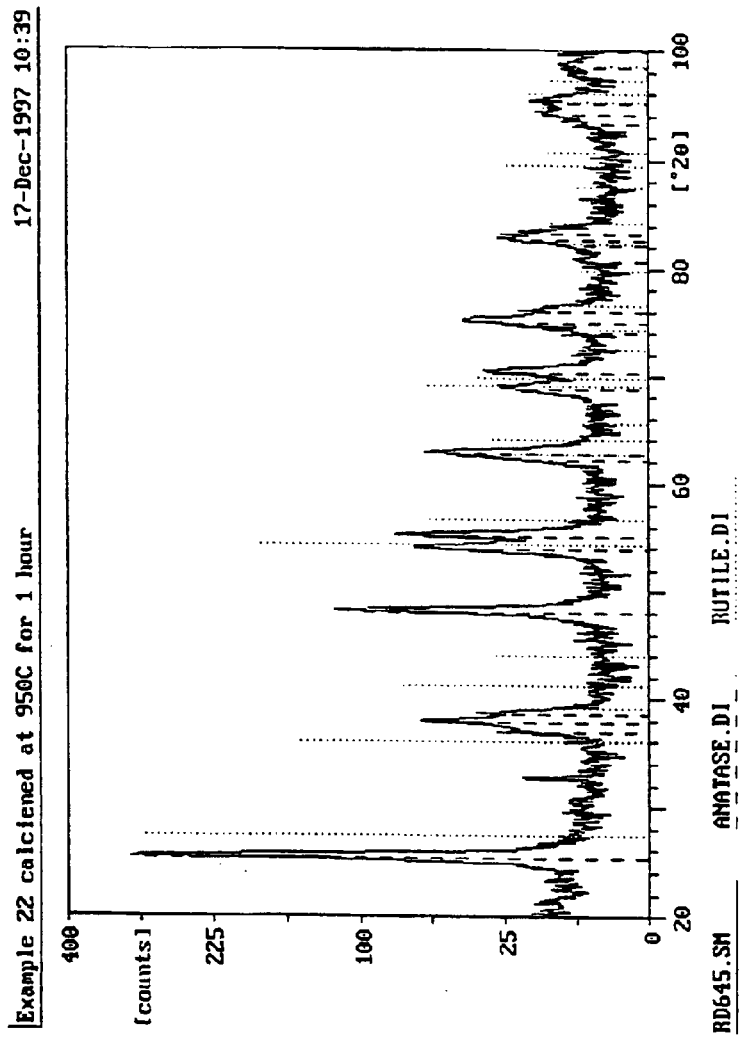
FIG. 3 is an X-ray diagram for modified titanium dioxide (example 22).

This can be noticed also from the X-Ray diagrams (see FIGS. 1 and 3) for the sample 22 compared with the commercial titanium dioxide UNITi 908 calcined at 950° C. for 1 hour. The modified titanium dioxide contains only initial crystaline anatase phase, once about 60% of the commercial titanium dioxide had been converted into rutile.

EXAMPLE 23

In this Example it is demonstrated the effectiveness of the modified titanium dioxide as an active component used in the Claus catalyst.

The modified titanium dioxide as obtained in Example 1, was mixed with powdery silica N60 (produced by PPG) and an acid silica sol. The powdery silica was used as an inert filler and the silica sol was used as a binder component. The composition of this mixture, in weight percentage was as follows:

| | |
|---|---|
| Modified titanium dioxide | 24.9% |
| Powdery silica | 64.6%, and |
| Silica sol (calculated as SiO$_2$) | 10.5%, |

The mixture was granulated into extrudates with a diameter of 3.6 mm, dried at 100° C. for two hours and then calcined at 400° C. for three hours. The result with this catalyst tested in a bench scale pilot plant, using the known conditions as used in the Claus process were as follows:

| The reaction | The catalytic activity (%) |
|---|---|
| H$_2$S + SO$_2$ | 100* |
| COS + H$_2$O | 100 |
| CS$_2$ + H$_2$O | 98. |

(*expressed the activity as shown by the conversion related to the equilibrium).

EXAMPLE 24

This Example shows that the modified titanium dioxide can be used also as a carrier for catalysts which is effective in the oxidation of organic compounds in a gas phase.

Two samples were prepared and tested in a laboratory unit for the catalytic oxidation of propane (3 mol.%) in air at 400° C., in the two cases titanium dioxide was doped with vanadium oxide.

The compositions of the catalysts and the results of the respective tests are given in table 15. As can be noticed the titanium dioxide as prepared by the present invention is useful as a catalyst carrier for organic impurities in air oxidation.

EXAMPLE 25

An experiment was carried out, to show that the titanium dioxide according to the present invention can be successfully used as a photocatalyst for detecting organic impurities in water oxidation. The titanium hydroxide precipitated from a sulfate solution in the presence of urea and after washing was separated in the form of a wet cake containing 25% by weight TiO2 before the treatment with basic silica sol (as in Example 7).

The procedure of the testing consists in the use of a suspension of 0.15–0.30 grams, calculated as TiO2 placed in a bottle of 2 l. A quartz tube (internal diameter 1 cm and length 1 m) was used as a sun radiation reactor. Through this reactor and a bottle of water a stream containing 35 to 44 ppm of atrazine was pumped through.

A comparative test with a commercial titanium dioxide (P 25, as produced by Degussa) was used for photodegradation of organic impurities in water. As can be noticed from Table 16, the titanium dioxide according to the present invention can be useful also as a photocatalyst for this purpose.

TABLE 1

Specific surface areas of titanium dioxides modified with urea in the process of titanium hydroxides precipitation from a solution of ammonium titanyl sulfate, following a hydrothermal treatment in its mother liquor and then modified with basic silica sol.

| Example No. | Specific surface area of TiO$_2$ modified with urea m$^2$g$^{-1}$ | Quantity of silica sol calculated as % SiO$_2$ in TiO$_2$ | Specific surface area of samples treated with basic silica sol, m$^2$g$^{-1}$ | | |
|---|---|---|---|---|---|
| | | | Dried sample | After calcination for 3 hours at a temperature of, ° C. | |
| | | | | 500 | 700 |
| 1. | 392 | 3 | 436 | 207 | 113 |
| 2. | 399 | 5 | 448 | 283 | 144 |
| Commercial TiO$_2$ UNITi 908 | 328$^x$ | | | 93$^x$ | 24$^x$ |

$^x$UNITi 908 was tested without treatment with basic silica sol.

TABLE 2

Conditions of titanium hydroxides precipitation and hydrothermal treatment in the presence of urea.

| Example No. | Concentration of TiO$_2$ in a solution neutralized with ammonia as g/l | pH of the neutralized solution | Weight ratio urea:TiO$_2$ | Duration of heating, (hours) |
|---|---|---|---|---|
| 3–5 | 123 | 0.90 | 3.3 | 2.6 |
| 6 and 6A | 125 | 1.10 | 3.6 | 2.5 |
| 7 | 128 | 0.80 | 2.0 | 2.5 |

TABLE 2-continued

Conditions of titanium hydroxides precipitation and hydrothermal treatment in the presence of urea.

| Example No. | Concentration of $TiO_2$ in a solution neutralized with ammonia as g/l | pH of the neutralized solution | Weight ratio urea:$TiO_2$ | Duration of heating, (hours) |
|---|---|---|---|---|
| 8–9 | 128 | 1.67 | 2.0 | 5.5 |
| 10 | 123 | 0.80 | 2.8 | 2.3 |
| 11 | 70 | 0.97 | 2.9 | 3.5 |
| 12 | 123 | 0.84 | 3.6 | 4.0 |
| 13 | 120 | 0.97 | 2.1 | 3.5 |
| 14 | 126 | 0.02 | 10.3 | 3.0 |
| 15 | 122 | 0.92 | 3.6 | 2.3 |
| 16 | 126 | 1.20 | 1.5 | 2.5 |
| 17 | 91 | 0.69 | 2.63 | 2.2 |
| 18 | 70 | 0.93 | 3.0 | 3.5 |

TABLE 3

Conditions of titanium hydroxides interaction with basic silica sols.

| | | | | Quantity of silica sol calculated as % $SiO_2$ in $TiO_2$ | |
|---|---|---|---|---|---|
| Example No. | Concentration of titanium hydroxide in suspension (as % $TiO_2$) | Concentration of silica sol, (as g/l $SiO_2$) | Cationic form of silica sol | Introduced in suspension or in cake | Taken up by titanium hydroxide |
| 3 | 10 | 3.0 | Na | 10.0 | 9.9 |
| 4 | 10 | 3.0 | K | 10.0 | 9.9 |
| 5 | 10 | 2.9 | $NH_4$ | 10.0 | 9.9 |
| 6 | 10 | 3.2 | $NH_4$ | 7.0 | 6.9 |
| 6A | 10 | 3.3 | $NH_4$ | 15.0 | 13.8 |
| 7 | 10 | 3.0 | $NH_4$ | 2.0 | 2.0 |
| 8 | 10 | 3.4 | $NH_4$ | 3.0 | 3.0 |
| 9 | 10 | 3.4 | $NH_4$ | 7.0 | 6.0 |
| 10 | wet cake | 3.2 | $NH_4$ | 30.0 | 15.3 |
| 11 | 12 | 3.3 | $NH_4$ | 10.0 | 10.7 |
| 12 | wet cake | 20.6 | $NH_4$ | 16.5 | 13.4 |
| 13 | 15 | 11.6 | $NH_4$ | 5.0 | 5.0 |

TABLE 4

Specific surface areas of modified titanium dioxides.

| | Specific surface area, ($m^2g^{-1}$) | | | | | |
|---|---|---|---|---|---|---|
| | Modified with urea and dried | Modified with urea and basic silica sol | | | | |
| Example No. | at 110° C. | Dried at 110° C. | calcined for 3 hours at | | | |
| | | | 500° C. | 700° C. | 800° C. | 900° C. |
| 3 | 416 | 442 | | | 141 | 65 |
| 4 | 416 | 434 | | | 139 | 65 |
| 5 | 416 | 453 | 327 | 277 | 164 | 110 |
| 6 | 424 | 470 | 285 | 170 | 116 | |
| 6A | 424 | 478 | 357 | 269 | 203 | |
| 7 | 393 | 393 | | | 53 | 28 |
| 8 | 390 | 448 | | 111 | 72 | 31 |
| 9 | 390 | 450 | | 170 | 119 | 56 |
| 10 | 360 | | 312 | | 228 | 146 |
| 11 | 403 | 429 | | | 142 | 81 |
| 12 | 406 | 430 | 367 | 269 | | |
| 13 | 400 | 435 | 238 | 141 | | |
| 14 | 434 | | | | | |
| 15 | 460 | 490 | | | | |
| 16 | 416 | | | | | |
| 17 | 402 | | | | | |
| 18 | 365 | | 234 | 115 | | |
| (UNITi 908 Commercial $TiO_2$) | | 328 | 93 | 24 | | |

TABLE 5

Comparison of modificatory effects of acid and basic silica sols.

| Example No. | Specific surface area of original $TiO_2$, ($m^2g^{-1}$) | Type of silica sol | Quantity of silica sol, as % $SiO_2$ in $TiO_2$ | Specific surface area ($m^2g^{-1}$), after calcination for 3 h. at a temperature of | |
|---|---|---|---|---|---|
| | | | | 500° C. | 700° C. |
| 13 | 400 | acidic | 8 | | 107 |
| 14 | 400 | basic | 5 | 242 | 145 |
| 15 | 416 | acidic | 4 | 155 | 62 |
| 16 | 416 | basic | 4 | 230 | 123 |
| 17 | 416 | without | | 111 | 8 |

TABLE 6

Commercial titanium dioxides modified with silica sol.

| Example No. | The sample of the TiO₂ used | Quantity of used TiO₂ (grams) | Concentration of silica sol as % SiO₂ in sol | Suspension or wet cake were treated | Quantity of silica sol as % SiO₂ calculated on TiO₂ introduced in the suspension or in the cake | Quantity of silica sol as % SiO₂ calculated on TiO₂ taken up by TiO₂ |
|---|---|---|---|---|---|---|
| 20 | S-140 | 200 | 3.1 | suspension | 7 | |
| "  | S-140 | 200 | 3.1 | suspension | 10 | |
| "  | S-140 | 200 | 3.1 | suspension | 14 | |
| 21 | S-150 | 200 | 3.3 | suspension | 7 | |
| "  | S-150 | 200 | 3.3 | suspension | 10 | |
| 22 | UNITi 908 | 10 | 20.6 | wet cake | 15 | 13 |

TABLE 7

Specific surface areas of commercial titanium dioxides modified with ammonium silica sols

| Example No. | Quantity of silca sol as % SiO₂ in TiO₂ | Dried sample | Calcined for 3 hours at various temperatures: 500° C. | 700° C. | 800° C. | 900° C. |
|---|---|---|---|---|---|---|
| 20 | none | 329ˣ | | 16 | | |
| "  | 7 | | | 101 | 58 | |
| "  | 10 | | | 119 | | |
| "  | 14 | | 191 | 143 | 94 | |
| 21 | 7 | 290 | 234 | 102 | 90 | |
| "  | 10 | | | 126 | | |
| 22 | 15 | | 227 | 210 | 116 | 80 |
| "  | none | 328 | 93 | 24 | | |

(ˣmeasured by a Coutter Instrument)

TABLE 8

Hydrothermal stability of the modified titanium dioxides in comparison with known ones.

| Example No. | Specific surface area (m²⁺g⁻¹), after steamingˣ during 5 hours at 400° C. |
|---|---|
| 6 | 173 |
| 6A | 320 |
| 21 | 132 |
| Commercial TiO₂ UNITi 908 | 94 |
| S-150 | 84 |

Note: ˣthe steaming stream contained 90% by volume water vapors and 10% by volume air.

TABLE 9

Sulfur content of modified titanium dioxides

| Example No. | Sulfur content, (% by weight) Calculated as sulfur | Calculated as (SO4²) |
|---|---|---|
| 1 | 0.04 | 0.12 |
| 5 | 0.24 | 0.72 |
| 10 | 0.10 | 0.30 |
| 22 | 0.07 | 0.21 |
| Commercial titanium dioxide | 0.3–1.0 | 0.9–3.0 |

TABLE 10

Specific surface area distribution on pore diameters of modified titanium dioxides in comparison with known ones.

| | Total specific surface area | | Specific surface area formed by pores with a diameter greater than: | | | | | |
|---|---|---|---|---|---|---|---|---|
| | | | 4.10 nm | | 3.5 nm | | 3.3 nm | |
| Example | $m^2g^{-1}$ | In % of analogous value for a commercial sample S-140 | $m^2g^{-1}$ | In % of analogous value for a commercial sample S-140 | $m^2g^{-1}$ | In % of analogous value for a commercial sample S-140 | $m^2g^{-1}$ | In % of analogous value for a commercial sample S-140 |
| Example 6 TiO$_2$ before treating with basic silica sol. | 424 | 129 | 180 | 269 | 334 | 380 | 352 | 352 |
| TiO$_2$ treated with basic silica sol as described in Example 6 | 470 | 143 | 251 | 375 | 352 | 400 | 371 | 371 |
| Example 6A TiO$_2$ treated with basic silica sol as described in Example 6A | 476 | 145 | 319 | 476 | 367 | 417 | 378 | 393 |
| Example 15 TiO$_2$ before treating with basic silica sol | 490 | 149 | 182 | 272 | 242 | 275 | 259 | 270 |
| Commercial TiO$_2$ - UNITi-908 | 328 | 100 | 48 | 72 | 62 | 70 | 67 | 70 |
| Commercial TiO$_2$ S-140 | 329 | 100 | 67 | 100 | 88 | 100 | 96 | 100 |

Note: all the data listed in this Table were measured with Coutter Instrument SA 3100.

TABLE 11

The adsorption pore volume distribution on pore diameters of modified titanium dioxides compared with known ones.

| | Adsorption pore volume formed by pores with diameter | | | | | |
|---|---|---|---|---|---|---|
| | less than 100 nm | | greater than 4.1 nm | | greater than 3.5 nm | |
| Example | cc/1 g | In % of analogous value for commercial sample S-140 | cc/1 g | In % of analogous value for commercial sample S-140 | cc/1 g | In % of analogous value for commercial sample S-140 |
| Example 6 TiO$_2$ before the treatment with basic silica sol | 0.47 | 147 | 0.23 | 110 | 0.41 | 178 |
| TiO$_2$ treated with basic silica sol as described in Example 6 | 0.52 | 163 | 0.31 | 148 | 0.41 | 178 |
| Example 6 A TiO$_2$ treated with basic silica sol as described in Example 6 A | 0.63 | 180 | 0.49 | 233 | 0.64 | 235 |
| Example 15 TiO$_2$ before the treatment with basic silica sol | 0.58 | 160 | 0.36 | 171 | 0.40 | 174 |

TABLE 11-continued

The adsorption pore volume distribution on pore diameters of modified titanium dioxides compared with known ones.

| | Adsorption pore volume formed by pores with diameter | | | | | |
|---|---|---|---|---|---|---|
| | less than 100 nm | | greater than 4.1 nm | | greater than 3.5 nm | |
| Example | cc/1 g | In % of analogous value for commercial sample S-140 | cc/1 g | In % of analogous value for commercial sample S-140 | cc/1 g | In % of analogous value for commercial sample S-140 |
| Commercial TiO$_2$ UNITI-908 | 0.32 | 91 | 0.20 | 105 | 0.22 | 96 |
| Commercial TiO$_2$ S-140 | 0.35 | 100 | 0.21 | 100 | 0.23 | 100 |

Note:
all the data listed in this Table were measured with Coulter Instrument SA 3100.

TABLE 12

Comparison of thermal stability of the modified titanium dioxide prepared according to the present invention and a mixed titania-silica oxides as described in the U.S. Pat. No. 4,221,768

| Samples prepared according to the present invention and calcined at 500° C. for 3 hours | | | Samples as described in the U.S. Pat. No. 4,221,768 (calcined at 500° C. for 3 hours) | | |
|---|---|---|---|---|---|
| Example No. | TiO$_2$ content of the sample, (% by weight) | Specific surface area (m$^2$g$^{-1}$) | Example | TiO$_2$ content of the sample (% by weight) | Specific surface area (m$^2$ g$^{-1}$) |
| 12 | 86 | 367 | 1 | 84 | 220 |
| | | | 4 | 84 | 280 |
| 5 | 90 | 327 | 6 | 91 | 230 |

TABLE 13

Specific surface areas of calcined titanium dioxide according to the present invention, compared with those described in the European Patent Applications Nos.: 0576120 and 0311515.

| | | Specific Surface area of calcined samples, (m$^2$g$^{-1}$) | | | |
|---|---|---|---|---|---|
| Conditions used in calcination | | The present invention | | EP 0576120 | EP 03115115 |
| temperature ° C. | duration, hours | Example 6 | Example 10 | Example 1 | Example Q |
| 575 | 1 | 229 | 360 | | 93 |
| 575 | 7 | 210 | 350 | | 85 |
| 800 | 3 | 116 | 228 | 65.6 | |

TABLE 14

Comparison between structural indicators of calcined samples prepared according to the present invention and those described in the literature.

| | Prepared according to the present invention | | | | Described in literature | | | | |
|---|---|---|---|---|---|---|---|---|---|
| | Quantity of silicon introduced in the titania's structure | Calcining conditions | | Specific surface | Quantity of silica in titania/silica mixed | Calcining conditions | | Specific surface | |
| Example | calculated as $SiO_2$, % | Temperature °C. | Duration hours | area ($m^2g^{-1}$) | oxides (%) | Temperature °C. | Duration hours | area ($m^2g^{-1}$) | References |
| 5 | 9.9 | 700 | 3 | 277 | 20.0 | 600 | | 85 | Applied |
| 6 | 6.9 | 700 | 3 | 170 | | | | | Catalysis |
| 8 | 3.0 | 700 | 3 | 111 | | | | | A: General |
| 5 | 9.9 | 800 | 3 | 164 | | | | | 139 (1996) |
| 10 | 15.3 | 900 | 3 | 146 | | | | | 176–187 |
| 6 | 6.9 | 500 | 3 | 285 | 25.0 | 500 | 2 | 213 | Journal |
| 6A | 13.8 | 500 | 3 | 357 | | | | | of |
| 12 | 14.0 | 500 | 3 | 367 | | | | | catalysis |
| 21 | 7.0 | 500 | 3 | 234 | | | | | 105, 511–520 |
| 22 | 15.0 | 500 | 3 | 227 | | | | | (1987) |

TABLE 15

Catalytic oxidation of propane in air at 400° C.

| Number of samples from which titanium dioxide was taken | Quantity of vanadia introduced into $TiO_2$ (% by weight) | Quantity of doped $TiO_2$ in catalyst (% by weight) | Quantity of siliceous filler and binder in catalyst (% by weight) | Extent of oxidation, (%) |
|---|---|---|---|---|
| 5 | 3 | Doped titania as was used | | 100 |
| 12 | 5 | 38 | 62 | 100 |

TABLE 16

Photodegradation of atrazine in aqueous solutions

| | Duration of degradation, hours | | | |
|---|---|---|---|---|
| | 0 | 1 | 2 | 3 |
| Sample | Concentration of atrazine in ppm | | | |
| Titanium hydroxide from Example 7 | 35 | 28 | 23 | 17 |
| P-25 (Degussa) | 44 | 20 | | 17 |

What is claimed is:

1. A method for preparing silicon-containing titanium dioxide, comprising the steps of:
   a) precipitating titanium hydroxide from an aqueous solution containing dissolved sulfate salts, including titanyl sulfate, in the presence of urea;
   b) heating the precipitate in its aqueous mother liquor at a temperature in a range of between 70° C. to 200° C.;
   c) separating said titanium hydroxide precipitate from the solution and washing the same;
   d) reacting the precipitate, or a dried titanium dioxide obtained therefrom, with a basic silica sol to produce silicon-containing titanium hydroxide or silicon-containing titanium dioxide, and, in the case of silicon-containing titanium hydroxide, converting the same to silicon-containing titanium dioxide.

2. A method according to claim 1, wherein the aqueous solution comprises titanyl sulfate and one or more compounds selected from the group consisting of sodium sulfate, potassium sulfate, ammonium sulfate, calcium sulfate and magnesium sulfate, said solution having a pH below 1.7 before the introduction of urea thereto.

3. A method for preparing silicon-containing titanium dioxide according to claim 1, wherein the pH of the solution is in the range of between 0.02 to 1.2 before the introduction of the urea thereto.

4. A method for preparing silicon-containing titanium dioxide according to claim 1, wherein the aqueous solution has a titanium content in the range between 20 g/l to 150 g/l (calculated as $TiO_2$).

5. A method for preparing silicon-containing titanium dioxide according to claim 2, wherein urea is introduced into the aqueous solution, the weight ratio of said urea with respect to the titanium dioxide being in the range of between 0.3 to 11.

6. A method for preparing silicon-containing titanium dioxide according to claim 1, wherein the titanium hydroxide precipitate is heated in its aqueous mother liquor at a temperature in the range of between 70° C. to 200° C. for at least a half hour.

7. A method for preparing silicon-containing titanium dioxide according to claim 1, wherein the aqueous sulfate solution is obtained by dissolution of ammonium titanyl sulfate in water or in a sulfate solution.

8. A method for preparing silicon-containing titanium dioxide according to claim 1, wherein the basic silica sol, which is used to react with the titanium hydroxide precipitate or with a dried titanium dioxide obtained therefrom, has a concentration in the range of between 1% to 40% by weight (calculated as $SiO_2$) and a pH above 7.0.

9. A method for preparing silicon-containing titanium dioxide according to claim 8, wherein the weight ratio of $SiO_2$ in the silica sol to $TiO_2$ is the range between 0.01 to 0.30.

10. A method for preparing silicon-containing titanium dioxide according to claim 1, comprising:
   providing titanium hydroxide or titanium dioxide in the form of a dough, paste, suspension or wet cake;
   bringing the pH of said titanium hydroxide or titanium dioxide to a value in the range between 6.0 to 11;
   reacting said titanium hydroxide or titanium dioxide with basic silica sol, to obtain silicon-containing titanium hydroxide or silicon-containing titanium dioxide, and, in the case of silicon-containing titanium hydroxide, converting the same to silicon-containing titanium dioxide.

11. A method according to claim 10, wherein the pH is brought to a value in the range between 6.0 to 11 by means of an alkali constituent selected from the group consisting of urea, ammonia, sodium hydroxide, potassium hydroxide, sodium carbonate, potassium carbonate, sodium bicarbonate, potassium bicarbonate, calcium hydroxide or a mixture thereof.

12. The method of claim 1, wherein the titanium hydroxide precipitate is heated in its aqueous mother liquor at a temperature in the range of between about 80° C. to 200° C.

13. The method of claim 12, wherein the titanium hydroxide precipitate is heated in its aqueous mother liquor at a temperature in the range of between about 80° C. to 100° C.

14. The method of claim 1, wherein the titanium hydroxide precipitate in its aqueous mother liquor is heated for a period of time sufficient to cause additional titanium hydroxide to precipitate from the aqueous mother liquor.

15. A method for preparing silicon-containing titanium dioxide, comprising:
   a) providing titanium hydroxide or titanium dioxide in the form of a dough, paste, suspension or wet cake;
   b) bringing the pH of said titanium hydroxide or titanium dioxide to a value in the range between 6.0 to 11;
   c) reacting said titanium hydroxide or titanium dioxide with basic silica sol, to obtain silicon-containing titanium hydroxide or silicon-containing titanium dioxide, and, in the case of silicon-containing titanium hydroxide, converting the same to silicon-containing titanium dioxide.

16. The method according to claim 15, wherein the pH is brought to a value in the range between 6.0 to 11 by means of an alkali constituent selected from the group consisting of urea, ammonia, sodium hydroxide, potassium hydroxide, sodium carbonate, potassium carbonate, sodium bicarbonate, potassium bicarbonate, calcium hydroxide or a mixture thereof.

* * * * *